(12) United States Patent
Tho (10) Patent No.: US 8,801,109 B2
(45) Date of Patent: Aug. 12, 2014

(54) PROTECTION UNIT FOR DRIVING SOCKET OF HUB

(75) Inventor: Kee Ping Tho, Jiangsu (CN)

(73) Assignee: Kunshan Henry Metal Technology Co., Ltd., Jiangsu (CN)

( * ) Notice: Subject to any disclaimer, the term of this patent is extended or adjusted under 35 U.S.C. 154(b) by 271 days.

(21) Appl. No.: 13/247,066

(22) Filed: Sep. 28, 2011

(65) Prior Publication Data

US 2013/0076112 A1    Mar. 28, 2013

(51) Int. Cl.
*B60B 27/00*    (2006.01)

(52) U.S. Cl.
USPC ...................................................... 301/110.5

(58) Field of Classification Search
USPC ......... 301/110.5; 192/64, 70.2; 474/152–165, 474/902; 403/359.1, 359.6
See application file for complete search history.

(56) References Cited

U.S. PATENT DOCUMENTS

| 5,518,096 | A | * | 5/1996 | Lin | 192/64 |
| 8,096,623 | B2 | * | 1/2012 | You | 301/6.1 |
| 8,371,660 | B2 | * | 2/2013 | Shook | 301/6.9 |
| 2009/0066152 | A1 | * | 3/2009 | You | 301/106 |
| 2011/0175433 | A1 | * | 7/2011 | Chiang | 301/110.5 |
| 2011/0193406 | A1 | * | 8/2011 | Chiang | 301/110.5 |
| 2012/0139327 | A1 | * | 6/2012 | Chen | 301/110.5 |

* cited by examiner

*Primary Examiner* — Kip T Kotter
*Assistant Examiner* — Jean Charleston
(74) *Attorney, Agent, or Firm* — Rosenberg, Klein & Lee (57) ABSTRACT

A protection unit for a driving socket of a hub includes a hub with a driving socket connected to an end thereof and the driving socket has multiple ribs extending axially on the outer surface thereof. At least one protection unit is located between two ribs and has an engaging portion. A cover includes a cover face and two sidewalls so as to form an engaging groove. The engaging portion is engaged with the engaging groove. The three sides of the engaging portion are protected by the cover. The cover can be easily mounted to the ribs by the engagement of the engaging portion and the engaging groove so that the cover does not slip away from the ribs in radial direction.

7 Claims, 7 Drawing Sheets

PROTECTION UNIT FOR DRIVING SOCKET OF HUB

FIELD OF THE INVENTION

The present invention relates to a protection unit for the driving socket of a hub, and more particularly, to a U-shaped protection unit located between the rear sprocket and the hub to protect the transmission portion of the driving socket of the hub from being worn out by the sprocket.

BACKGROUND OF THE INVENTION

A conventional transmission way for the bicycle is to pedaling the pedals on the crank which rotates the chainwheel and the chain between the chainwheel and the rear sprocket which is fixedly mounted to the rear wheel hub so that the rear wheel rotates to move the bicycle forward. The rear wheel hub includes a hub, a driving socket fixed to an end of the hub and the rear sprocket mounted to the driving socket. When the chain rotates the rear wheel sprocket to rotate the rear wheel, the sequence of the transmission is the chain, the rear wheel sprocket, the driving socket, the hub and the rear wheel. The conventional rear wheel sprocket has a hole with multiple ribs extending axially from the inner periphery of the hole, and the driving socket has multiple grooves for receiving the ribs so as to connect the rear wheel sprocket to the driving socket. By the connection, the rear sprocket can transfer force to the rear wheel to move the bicycle forward.

In order to reduce the weight of the driving socket, the conventional driving socket is made by aluminum and the rear wheel sprocket is made by iron which is harder than the aluminum. The rear wheel sprocket is mounted to the driving socket by the engagement between the ribs and grooves so that the ribs made by aluminum are quickly damaged by the harder rear wheel sprocket. Besides, the hole of the sprocket is larger to the driving socket so as to be easily mounted to the driving socket, the gaps between the ribs and the grooves make wearing between the sprocket and the driving socket. The wearing makes the gaps to be larger and the larger gaps cause the pedaling to be mul-functioned which means no transmission force is generated and transferred to the rear wheel. Furthermore, the gaps generate noise during pedaling.

Taiwan Utility Model No. 096218930 discloses a hub 10, a driving socket 20 on one end of the hub 10 and a protection member. The driving socket 20 has an enlarged flange 22 on the side connected with the hub 10 and the multiple restriction ribs 211 and at least one positioning rib 212 are on the outer surface of the driving socket. The protection member is located on one side of the restriction ribs 211. The protection member has contact pieces 42 which are made by hard material and have the same amount of the restriction ribs 211.

Figure 1:
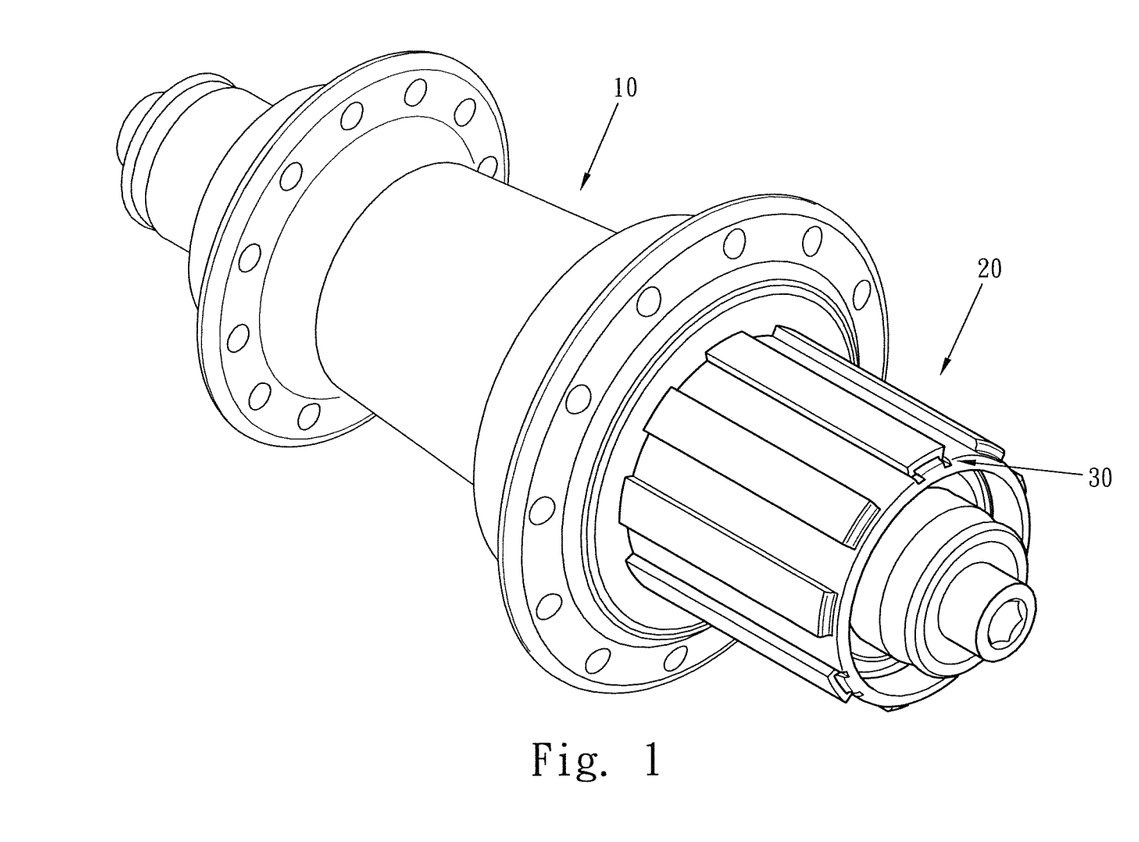
FIG. 1 is a perspective view to show the driving socket of a hub is protected by the protection unit of the present invention.
Figure 2:
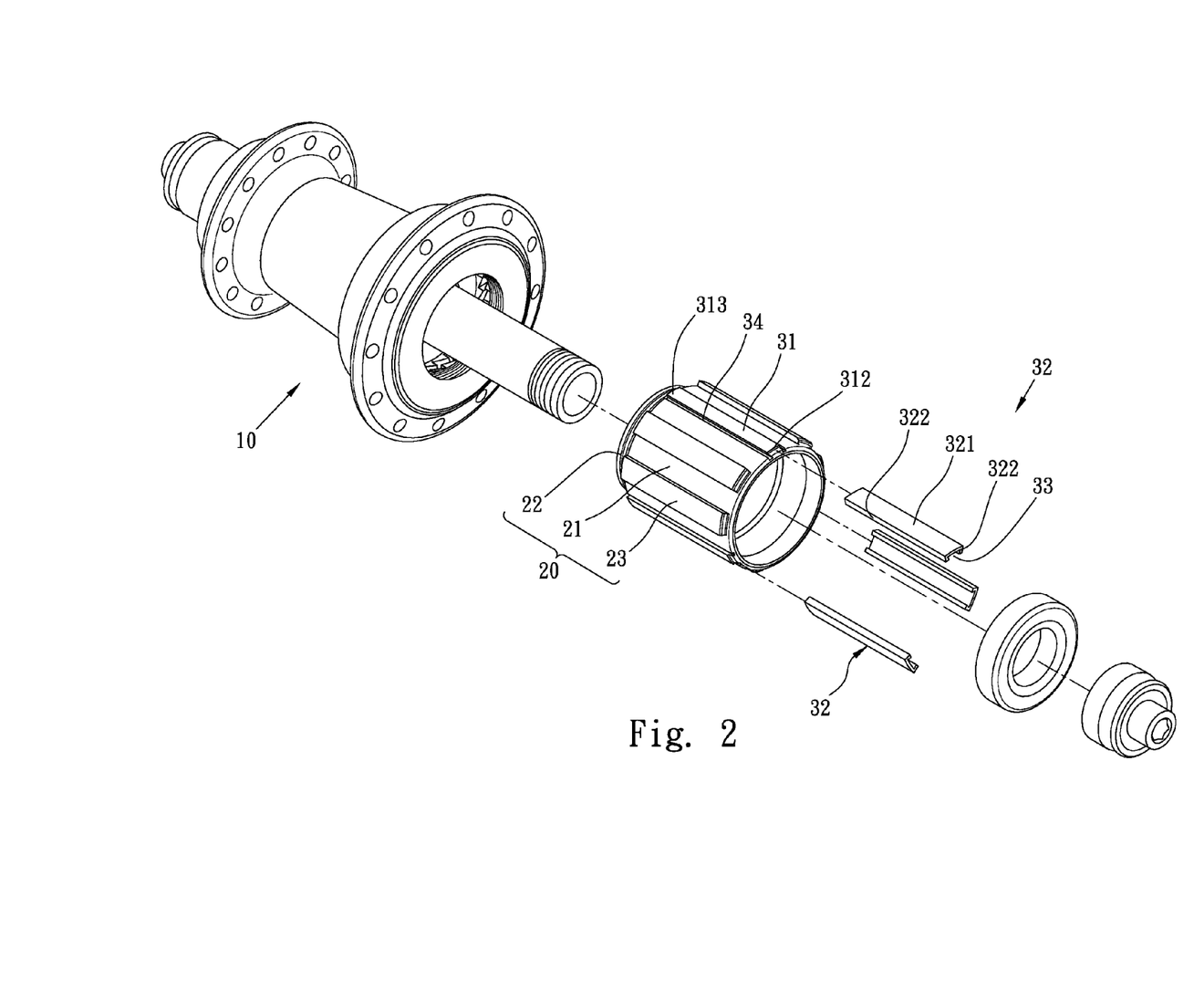
FIG. 2 is an exploded view to show the driving socket of a hub and the protection unit of the present invention.
Figure 3:
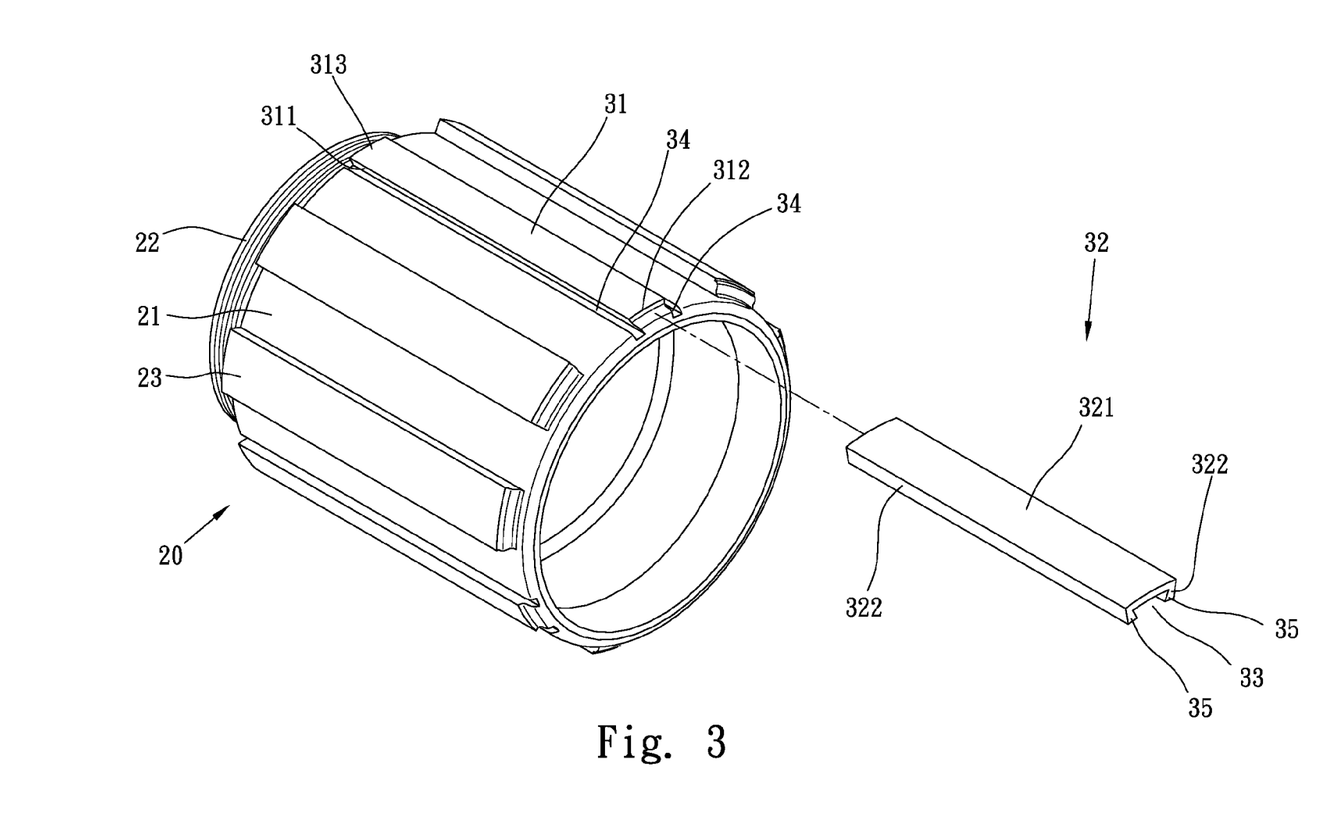
FIG. 3 is an exploded view to show the driving socket and the protection unit of the present invention.

As shown in FIG. 1 of Taiwan Utility Model No. 096218930, the protection member contacts the flange 22 and the restriction ribs 211 and each contact piece 42 has a ring 41 which is used to connect the contact pieces 42 and then the contact pieces 42 are connected to the driving socket 20 so as to protect the restriction ribs 211 from being worn out by the sprocket 30. However, each contact piece 42 contacts the restriction ribs and the flange by one side and a curved surface 421 thereof. The other end of the contact piece 42 is a free end. The distance between the free end to the ring 41 is so long so that a gap is formed between the free end and the restriction ribs 211. The gaps make the contact piece 42 cannot be matched with the restriction ribs 311. Once one of the contact pieces 42 is worn out severely, the whole protection member has to be replaced.

Figure 4:
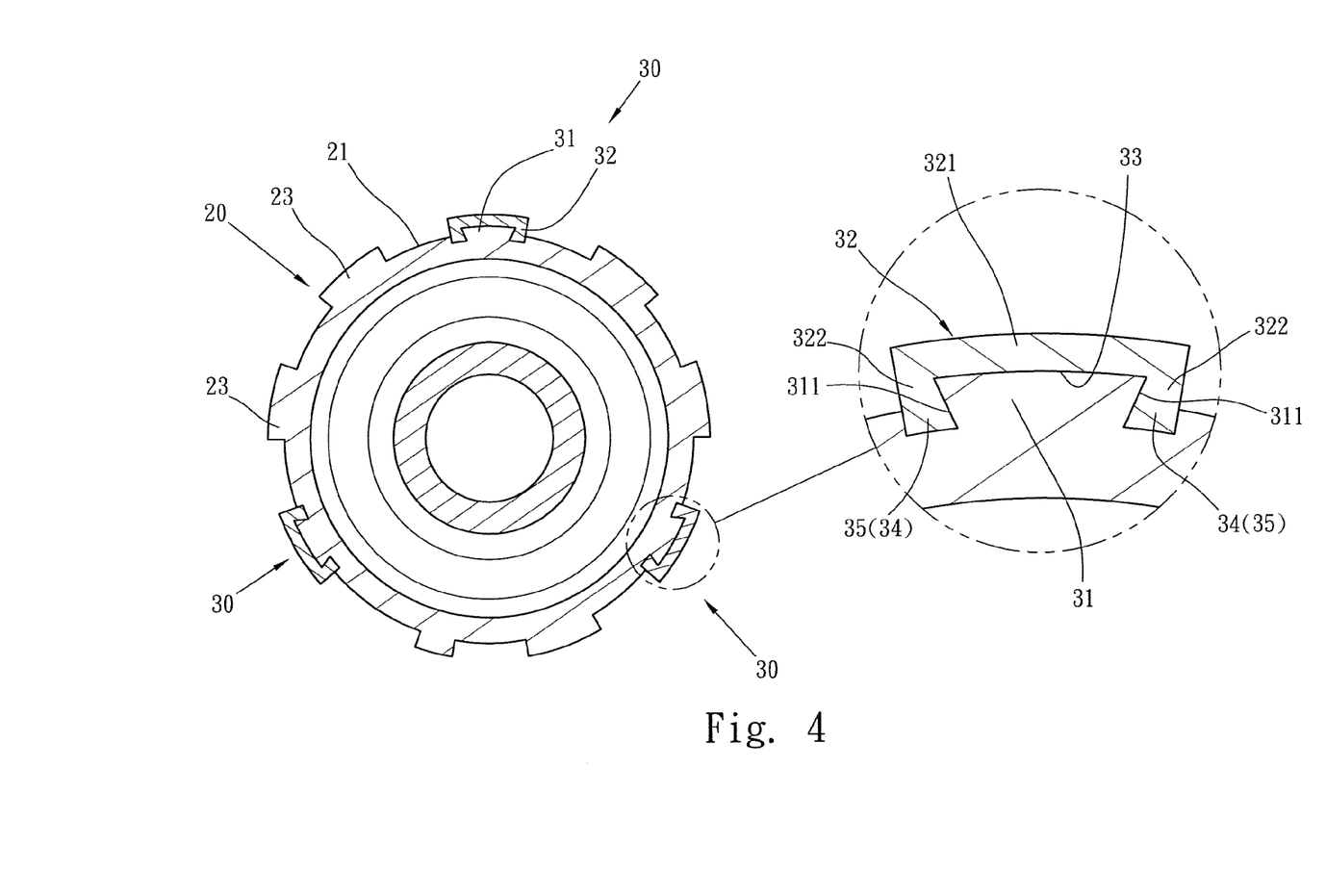
FIG. 4 is an end cross sectional view to show that the driving socket is connected with the protection unit of the present invention.

As shown in FIG. 4 of the Taiwan Utility Model No. 096218930, each contact piece 52 has a curved surface 521 and a protrusion 522 is located between adjacent curved surfaces 521. The driving socket 20 has recesses 213 for receiving the protrusions 522 so as to position the contact pieces 52 to the side of the restriction ribs 211. Although the restriction rib 211 is located on a side of the contact piece 52, the contact piece 52 is connected in radial direction from the outside of the driving socket 20 toward the center of the driving socket 20 and by the engagement between the protrusions 522 and the recesses 213. After being re-assembled and assembled several times, wearing between the protrusions 522 and the recesses 213 makes the contact pieces 52 cannot be matched with the driving socket 20 and even worse, the contact pieces 52 drop from the outer surface 21 of the driving socket 20 radially.

Figure 5:
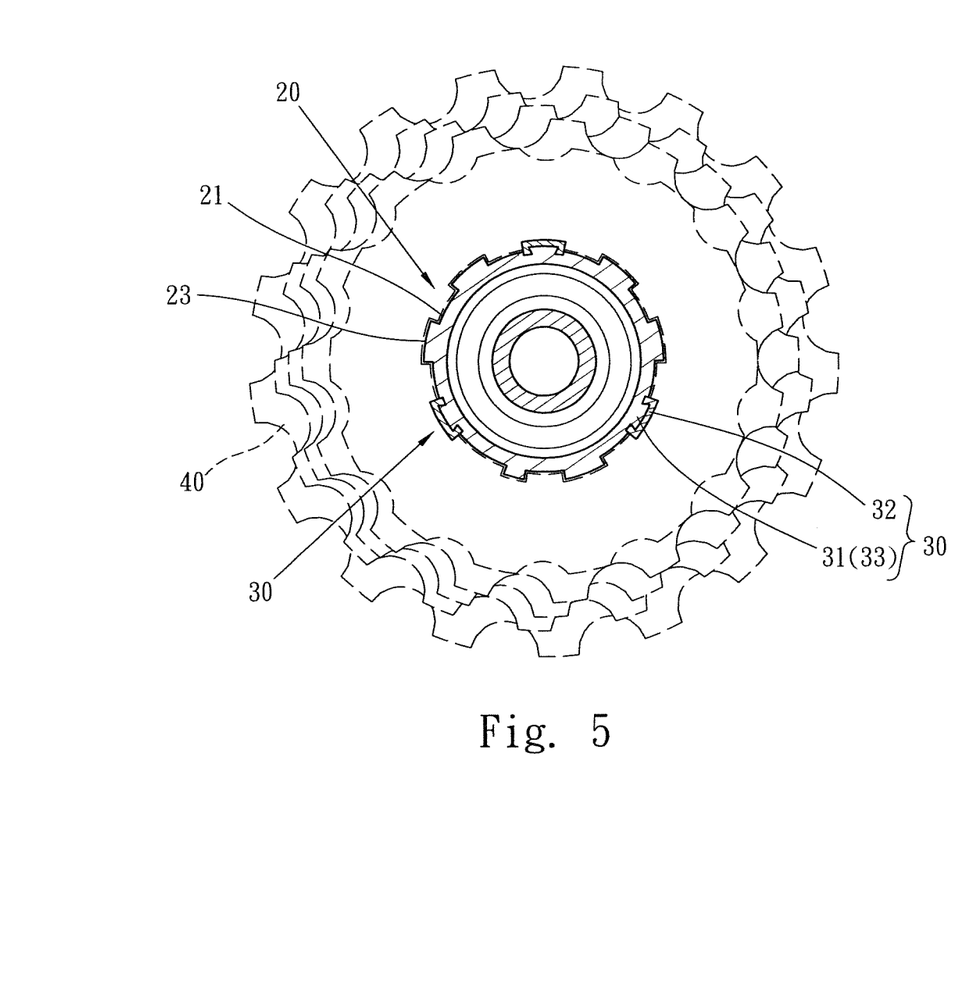
FIG. 5 is an end cross sectional view to show that the driving socket is connected with the protection unit of the present invention, and the hub is connected with rear sprockets.

As shown in FIG. 5 of the Taiwan Utility Model No. 096218930, each contact piece 62 has a curved surface 621 which is matched with the outer surface 21 and each contact piece 62 has a thin guide surface 622 perpendicularly defined in a side which is located adjacent to the restriction rib 211. Each restriction rib 211 has a guide slot 214 which is located corresponding to the guide surface 622. The contact pieces 62 are engaged with the side of the restriction ribs 211 by the engagements between the curved surface 621 and the outer surface 21, and between the guide surfaces 622 and the guide slots 214. However, the contact pieces 62 contacts the restriction ribs 211 only by the guide surface 622, and the other side away from the restriction rib 211 does not have any restriction means to position that side, so that the contact pieces 62 are easily disengaged from the outer surface 21 in the direction that is away from the restriction ribs 211. When in assembling, the contact pieces 62 are respectively in contact with the side of the restriction ribs 211, the contact pieces 62 may drop from the tangent direction of the outer surface 21, so that the contact pieces 62 have to be re-assembled again.

The protection member can only protection one side of the restriction ribs 211 and when the rear wheel sprocket 30 rotates counter clockwise, the rear wheel sprocket 30 directly contact the driving socket 20 so that the other side of the restriction ribs 211 are worn out by the rear wheel sprocket 30. This protection member cannot be used for the bicycles with single rear wheel sprocket. Furthermore, when ridding on a rugged road, the vibration is transferred to the rear wheel hub and the rear wheel sprocket 30 directly contacts the sides of the restriction ribs that are not protected by the protection member, so that the driving socket is easily damaged and has to be replaced.

The present invention intends to provide a protection unit for a hub and the protection unit covers the three sides of the ribs.

SUMMARY OF THE INVENTION

The present invention relates to a protection unit for a driving socket of a hub, and the protection unit comprises a hub with a driving socket connected to an end thereof and the driving socket has multiple ribs extending axially on the outer surface thereof. At least one protection unit is located between two ribs and has an engaging portion which extends axially from outside of the protection unit. A cover has a cover face which has two sidewalls extending from the underside thereof. The cover face and the two sidewalls form an engaging groove, and the engaging portion is engaged with the engaging groove. The three sides of the engaging portion are protected by the cover. The cover can be easily mounted to the ribs by the engagement of the engaging portion and the engaging groove so that the cover does not slip away from the ribs in radial direction.

The primary object of the present invention is to provide a protection unit for a driving socket of a hub, the protection unit is a U-shaped member which covers threes of the rib on the driving socket so that the ribs are protected from being worn out by the rear wheel sprocket regardless of the direction of rotation of the rear wheel sprocket.

The second object of the present invention is to provide a protection unit which has two gradually tapered surfaces on two sides thereof so as to be engaged with the transmission portion of the driving socket to ensure that the protection unit is firmly connected to the driving socket.

The third object of the present invention is to provide a protection unit wherein the transmission portion of the driving socket is covered by the U-shaped protection unit so that the driving socket is protected from being worn out by the rear wheel sprocket when ridding on a rugged road.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 5, the protection unit of the present invention comprises a hub 10 with a driving socket 20 connected to an end thereof and a rear wheel sprocket 40 is connected to the driving socket 20. The driving socket 20 is a cylindrical socket and has an outer surface 21, a connection portion 22 and multiple ribs 23 which extend axially on the outer surface 21. The connection portion 22 is connected an end of the driving socket 20 and the diameter of the connection portion 22 is smaller than the diameter of the ribs 23 on the driving socket 20. The connection portion 22 is connected to the hub 10. The ribs 23 are connected with the rear wheel sprocket 40.

There are three protection units 30 in this embodiment, and each protection unit 30 is located between two ribs 23 and has an engaging portion 31 and a cover 32. The engaging portion 31 extends axially from outside of the protection unit 30 and two transmission surfaces 311 are respectively located on two sides of the engaging portion 31. Each transmission surface 311 is gradually tapered toward the center of the driving socket 20. Each of the two sides of the engaging portion 31 has a positioning slot 34 which is located at the connection area with the outer surface 21 of the driving socket 20. The engaging portion 31 has a first end 312 and a second end 313, wherein the first end 312 is located remote from the hub 10 and the second end 313 is located close to the hub 10. The cover 32 is an elongate member and has a cover face 321 which has two sidewalls 322 extending from the underside thereof. The cover face 321 and the two sidewalls 322 form an engaging groove 33, and the engaging portion 31 is engaged with the engaging groove 33. The engaging groove 33 includes two inclined surfaces on two sides thereof and the two inclined surfaces are located corresponding to the transmission surfaces 311. Each sidewall 322 has an extension 35 whose cross section is shaped corresponding to the shape of the positioning slot 34. The first end 312 of each of the extensions 35 is engaged with the positioning slot 34 corresponding thereto. The cover 32 is then slid to the second end 313 to form the protection unit 30.

The three sides of the engaging portion 31 are covered by the cover 32 so that the three sides are not in contact directly with the rear wheel sprocket 40. The engaging portion 31 is axially connected to the engaging groove 33 so that the cover 32 is firmly positioned and does not loose.

When in assembling, the cover 32 is first connected to the first end 312 of the engaging portion 31 by engaging the engaging portion 31 with the engaging grooves 33, and engaging the extension 35 with the positioning slot 34. The cover 32 is then slid to the second end 313 so as to form the protection unit 30.

The driving socket 20 is connected to the hub 10 by the connection portion 22. The rear wheel sprocket 40 is then mounted to the driving socket 20 by engaging the rib 23 and the protection unit 30 with the rear wheel sprocket 40.

The cover 32 has the engaging groove 33 at the underside thereof so as to be mounted on the engaging portion 31 of the driving socket 20 to form the protection unit 30. The three sides of the engaging portion 31 are protected by the cover 32 so that the three sides are not in contact directly with the rear wheel sprocket 40, regardless of the direction of rotation of the rear wheel sprocket 40. The engaging portion 31 is axially connected to the engaging groove 33 so that the cover 32 is firmly positioned and does not loose. When the bicycle is ridden on a rugged road, the vibration is transferred to the rear wheel and the hub, the cover 32 protects the engaging portion 31 so that the wearing between the driving socket 20 and the rear wheel sprocket 40 can be avoided.

The engaging portion 31 includes two transmission surfaces 311 respectively located on the two sides thereof and each transmission surface 311 is gradually tapered toward the center of the driving socket 20. The transmission surface 311 is engaged with the engaging groove 33. The cover 32 is slide from the first end 312 to connect the engaging portion 31 and is secured by the engagement between the tapered transmission surface 311 and inclined surfaces of the engaging groove 33. The cover 32 is individually installed, so that it is easily installed and replaced when the cover 32 is damaged.

Each sidewall 322 has the extension 35 which is engaged with the positioning slot 34 corresponding thereto to increase the contact area between the cover 32 and the engaging portion 31.

Figure 6:
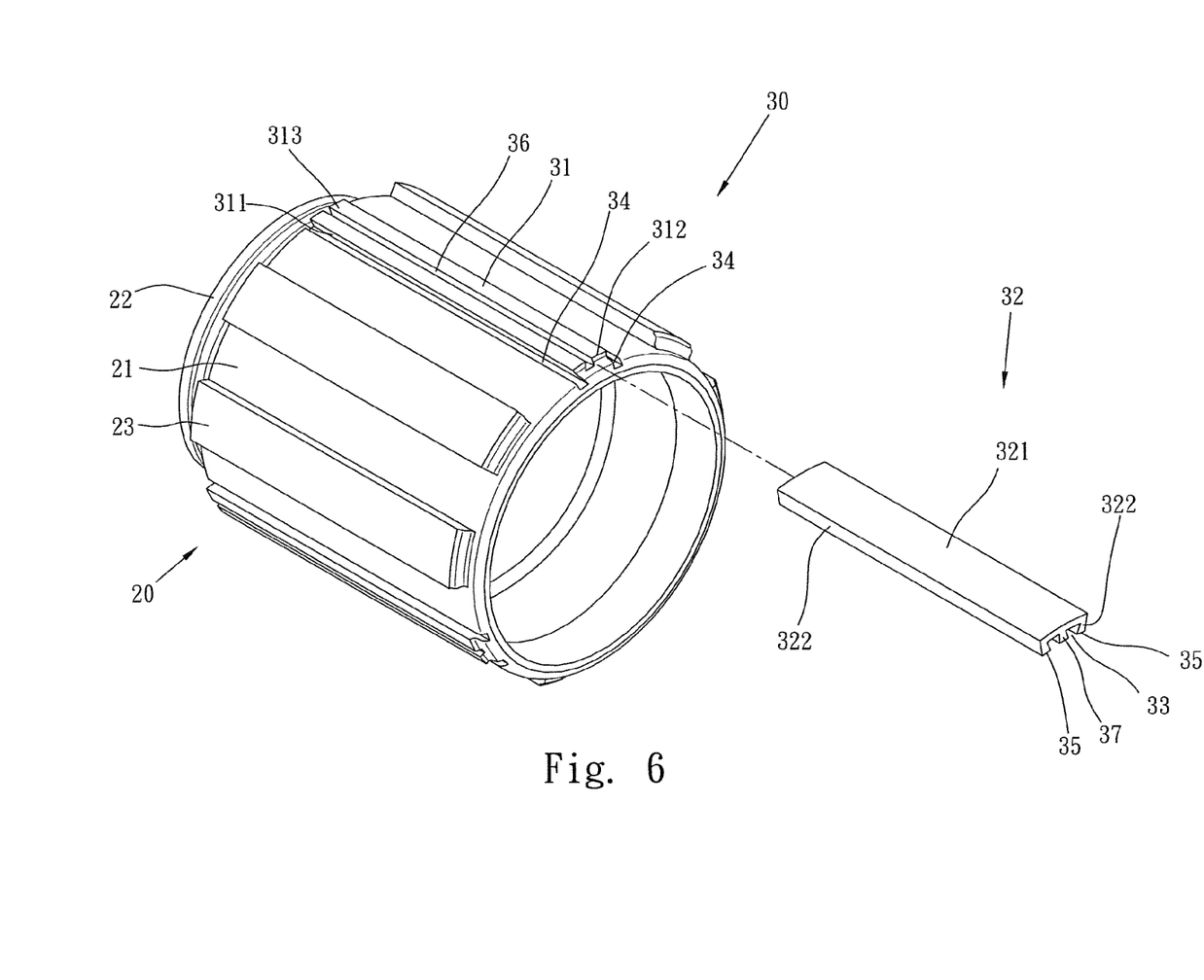
FIG. 6 is an exploded view to show the driving socket and the second embodiment of the protection unit of the present invention.
Figure 7:
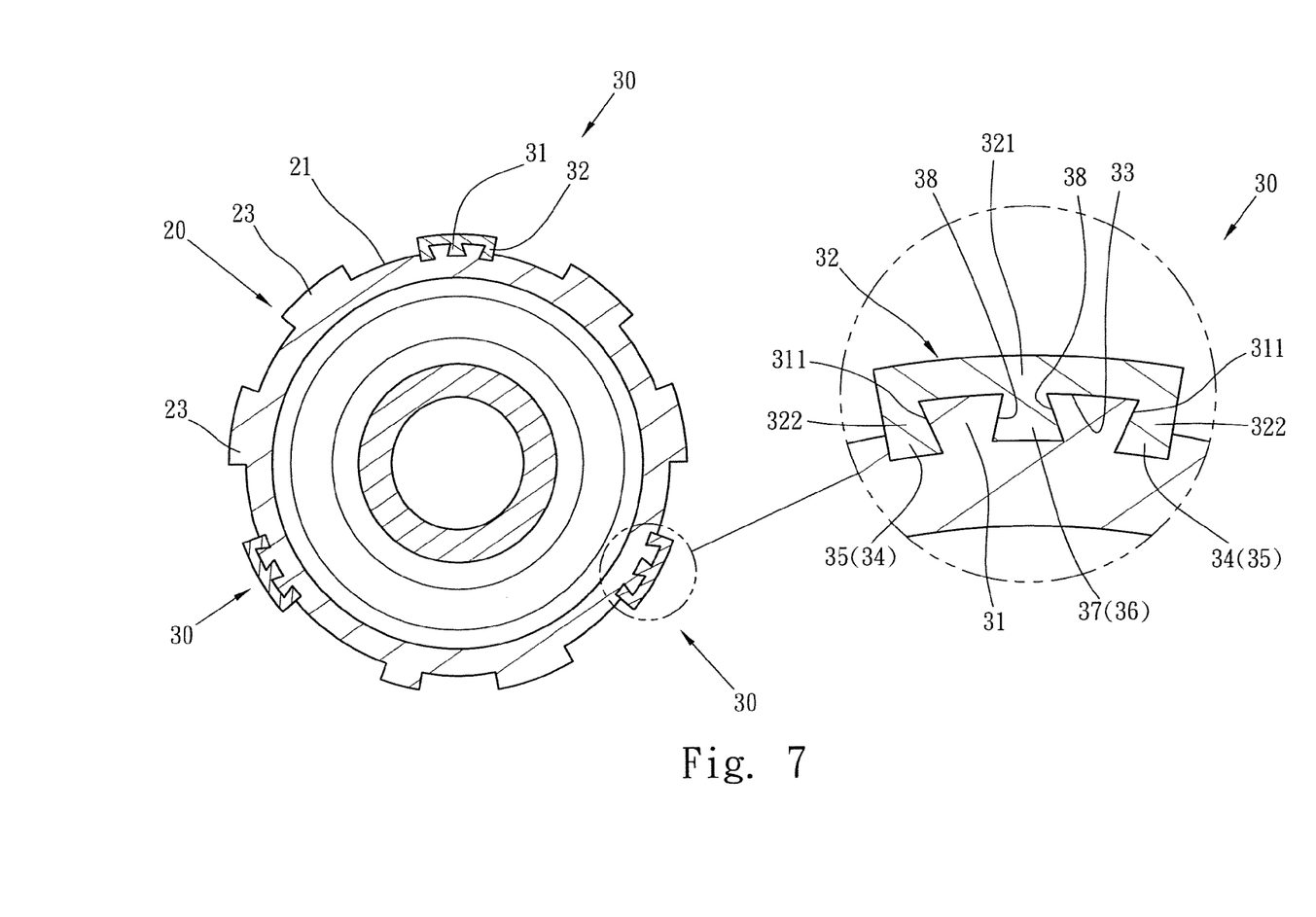
FIG. 7 is an end cross sectional view to show that the driving socket is connected with the second embodiment of the protection unit of the present invention.

As shown in FIGS. 6 and 7, which show the second embodiment, wherein the engaging portion 31 has a reception groove 36 defined axially in the outside thereof. The engaging groove 33 has an axial ridge 37 which is shaped to be corresponding to the shaped of the reception groove 36. The ridge 37 is engaged with the reception groove 36 so as to connect the cover 32 to the engaging portion 31. The reception groove 36 includes two contact faces 38 respectively located on the two sides thereof and each contact face 38 is gradually tapered toward a center of the driving socket 20. The ridge 37 has two inclined surfaces respectively located on the two sides thereof and the inclined surfaces of the ridge 37 are located corresponding to the contact faces 38 to engage the ridge 37 with the reception groove 36. Therefore, the cover 32 is firmly connected with the engaging portion 31. By the engagement between the reception groove 36 and the ridge 37, the cover 32 does not drop from the driving socket 20.

While we have shown and described the embodiment in accordance with the present invention, it should be clear to those skilled in the art that further embodiments may be made without departing from the scope of the present invention.

What is claimed is:

1. A protection unit of a driving socket for a hub, comprising:
    a driving socket having multiple ribs extending axially on an outer surface thereof;
    at least one protection unit located between two ribs of the driving socket and having an engaging portion which extends axially from the driving socket, and
    a cover having a cover face which has two sidewalls extending from an underside thereof, the cover face and the two sidewalls forming an engaging groove, the engaging portion being engaged with the engaging groove;
    wherein the engaging portion includes two transmission surfaces respectively located on two sides thereof and each transmission surface is gradually tapered toward a center of the driving socket, the engaging groove includes two inclined surfaces on two sides thereof and the two inclined surfaces are located corresponding to the transmission surfaces.

2. The protection unit as claimed in claim 1, wherein each of the two sides of the engaging portion has a positioning slot which is located at the connection area with the outer surface of the driving socket, each sidewall has an extension whose cross section is shaped corresponding to a shape of the positioning slot, the extensions are engaged with the positioning slots.

3. The protection unit as claimed in claim 2, wherein the engaging portion has a reception groove defined axially in an outside thereof, the engaging groove has an axial ridge which is shaped to be corresponding to a shaped of the reception groove, the ridge is engaged with the reception groove so as to connect the cover to the engaging portion.

4. The protection unit as claimed in claim 3, wherein the reception groove includes two contact faces respectively located on two sides thereof and each contact face is gradually tapered toward a center of the driving socket, the ridge has two inclined surfaces respectively located on two sides thereof and the inclined surfaces of the ridge are located corresponding to the contact faces to engage the ridge with the reception groove.

5. A protection unit of a driving socket of a hub, comprising:
    a driving socket having multiple ribs extending axially on an outer surface thereof;
    at least one protection unit located between two ribs of the driving socket and having an engaging portion which extends axially from the driving socket, and
    a cover having a cover face which has two sidewalls extending from an underside thereof, the cover face and the two sidewalls forming an engaging groove, the engaging portion being engaged with the engaging groove;
    wherein each of the two sides of the engaging portion has a positioning slot which is located at the connection area with the outer surface of the driving socket, each sidewall has an extension whose cross section is shaped corresponding to a shape of the positioning slot, the extensions are engaged with the positioning slots.

6. The protection unit as claimed in claim 5, wherein the engaging portion has a reception groove defined axially in an outside thereof, the engaging groove has an axial ridge which is shaped to be corresponding to a shaped of the reception groove, the ridge is engaged with the reception groove so as to connect the cover to the engaging portion.

7. The protection unit as claimed in claim 6, wherein the reception groove includes two contact faces respectively located on two sides thereof and each contact face is gradually tapered toward a center of the driving socket, the ridge has two inclined surfaces respectively located on two sides thereof and the inclined surfaces of the ridge are located corresponding to the contact faces to engage the ridge with the reception groove.

* * * * *